United States Patent [19]

Nakano et al.

[11] Patent Number: 4,635,959
[45] Date of Patent: Jan. 13, 1987

[54] SHOCK ABSORBER CONTROL SYSTEM

[75] Inventors: Yoshihisa Nakano, Nagoya; Masatoshi Ohira, Gifu; Manabu Ushida, Ama; Tomoyuki Miyagawa, Obu; Toshiya Shimodaira, Toyohashi, all of Japan

[73] Assignee: Nippondenco Co., Ltd., Kariya, Japan

[21] Appl. No.: 727,926

[22] Filed: Apr. 29, 1985

[30] Foreign Application Priority Data

Apr. 30, 1984 [JP] Japan .................................. 59-88209

[51] Int. Cl.$^4$ ............................................ B60G 17/08
[52] U.S. Cl. .................................. 280/707; 267/64.15
[58] Field of Search ............... 280/707, 6 R, 6 H, 6.1; 267/64.15

[56] References Cited

U.S. PATENT DOCUMENTS

| | | |
|---|---|---|
| 4,449,733 | 5/1984 | Iida et al. ............................ 280/707 |
| 4,469,315 | 9/1984 | Nicholls et al. ..................... 280/707 |
| 4,506,869 | 3/1985 | Masclet et al. .................... 267/64.15 |
| 4,506,909 | 3/1985 | Nakashima et al. ............. 267/64.15 |
| 4,511,022 | 4/1985 | Thomas et al. ...................... 280/707 |

Primary Examiner—Richard A. Bertsch
Attorney, Agent, or Firm—Cushman, Darby & Cushman

[57] ABSTRACT

A shock absorber control system comprises a plurality of switches for setting respective desired dampening forces, and controls a dampening force of a vehicle shock absorber linearly in accordance with a manipulation of one of the switches. The control system further comprises a height sensor for detecting a height of the vehicle and detects the dampening force of the shock absorber by the change of the detected height and corrects the dampening force of the shock absorber in accordance with a difference between the desired dampening force corresponding to the manipulated switch and the detected dampening force.

5 Claims, 8 Drawing Figures

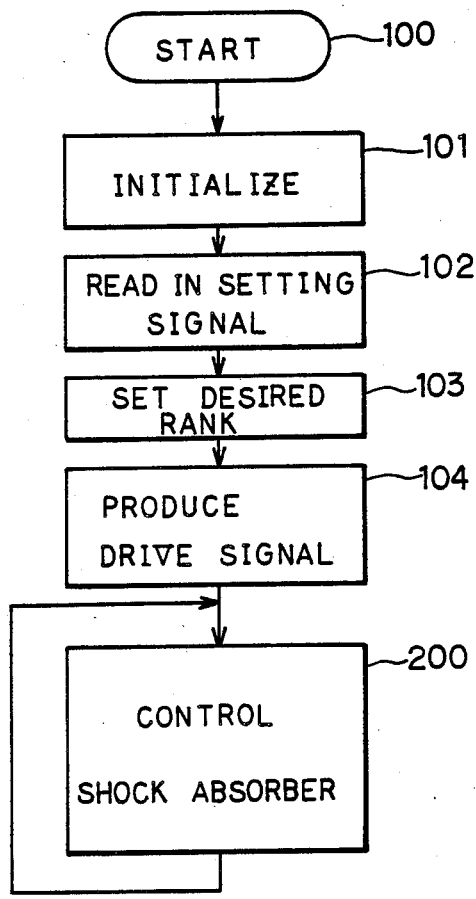

SHOCK ABSORBER CONTROL SYSTEM

BACKGROUND OF THE INVENTION

The present invention relates to a shock absorber control system for controlling a dampening force of a shock absorber of a vehicle.

Conventional shock absorber control system for a vehicle electronically controls a shock absorber to predetermined hard and soft dampening modes in accordance with the running conditions of the vehicle, so that vehicle drivability is improved.

To improve the vehicle drivability furthermore, the dampening force of the shock absorber must be controlled more linearly between the predetermined hard and soft dampening modes.

However, it is apprehended that the actual dampening force deviates from a desired dampening force by aging etc. in the case where the dampening force is controlled linearly.

SUMMARY OF THE INVENTION

It is an object of the present invention to provide a shock absorber control system which controls a dampening force of a shock absorber of a vehicle linearly to a desired dampening force without being affected by aging etc..

According to the present invention, a shock absorber control system comprises setting means for setting a desired dampening force linearly, detecting means for detecting an actual dampening force of a shock absorber, and correcting means for correcting the dampening force of the shock absorber in accordance with a difference between the desired dampening force and the detected dampening force.

BRIEF DESCRIPTION OF THE DRAWINGS

In the accompanying drawings:

FIGS. 4 and 5 are flowcharts illustrative of steps of operation of the shock absorber control system shown in FIG. 1.

DETAILED DESCRIPTION OF THE PREFERRED EMBODIMENTS

Figure 1:
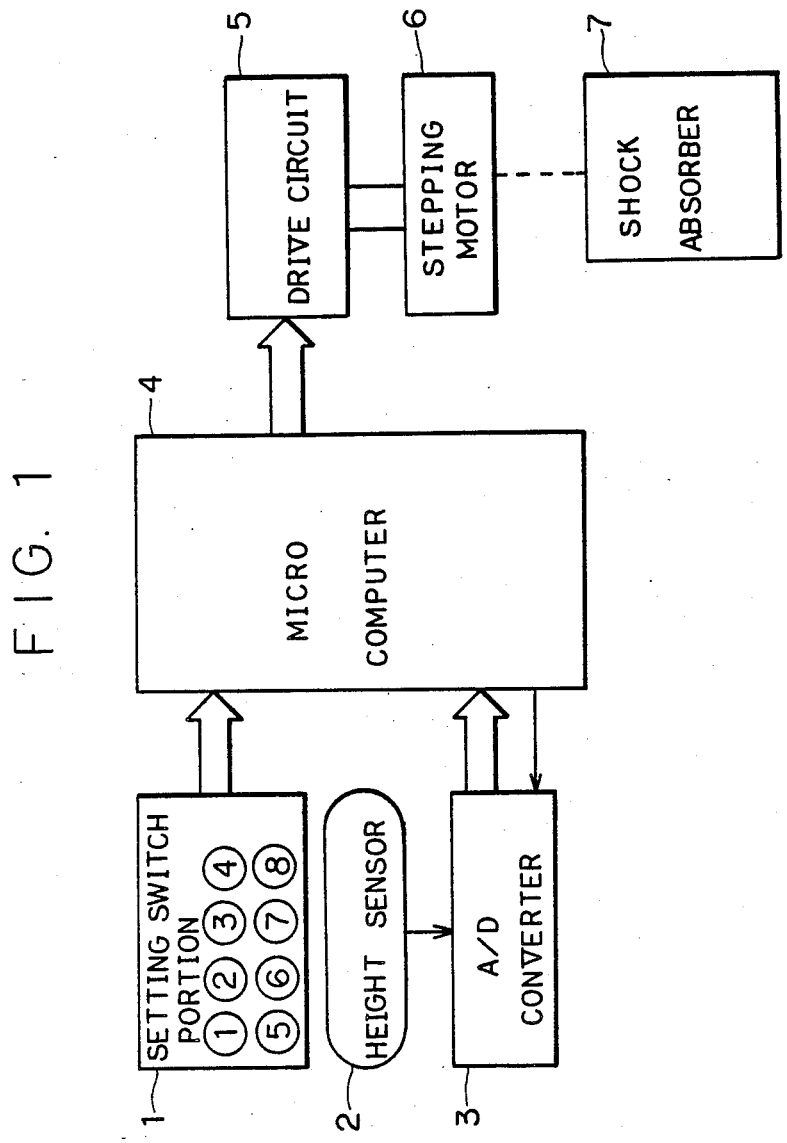
FIG. 1 is a block diagram of a shock absorber control system according to the present invention.

The present invention will now be described hereinunder with reference to the embodiment shown in the accompanying drawings. FIG. 1 is a block diagram showing the first embodiment. In FIG. 1, numeral 1 designates a setting switch portion having manually-operated switches 1 to 8 and a mechanism which holds only one of the switches 1 to 8 to a pushed condition for producing a setting signal corresponding to a pushed switch. Numbers given to the switches 1 to 8 respectively correspond to ranks of desired dampening forces and mean that the more the number is, the less the desired dampening force is, that is, the softer the dampening mode is. Numeral 2 designates a height sensor using a potentiometer for detecting a distance between the wheel axle and the chassis thereby to detect a height of the vehicle from the ground and producing an electric signal indicative of the detected height. Numeral 3 designates an A/D converter for converting the electric signal from the height sensor 2 to a digital signal.

Figure 5:
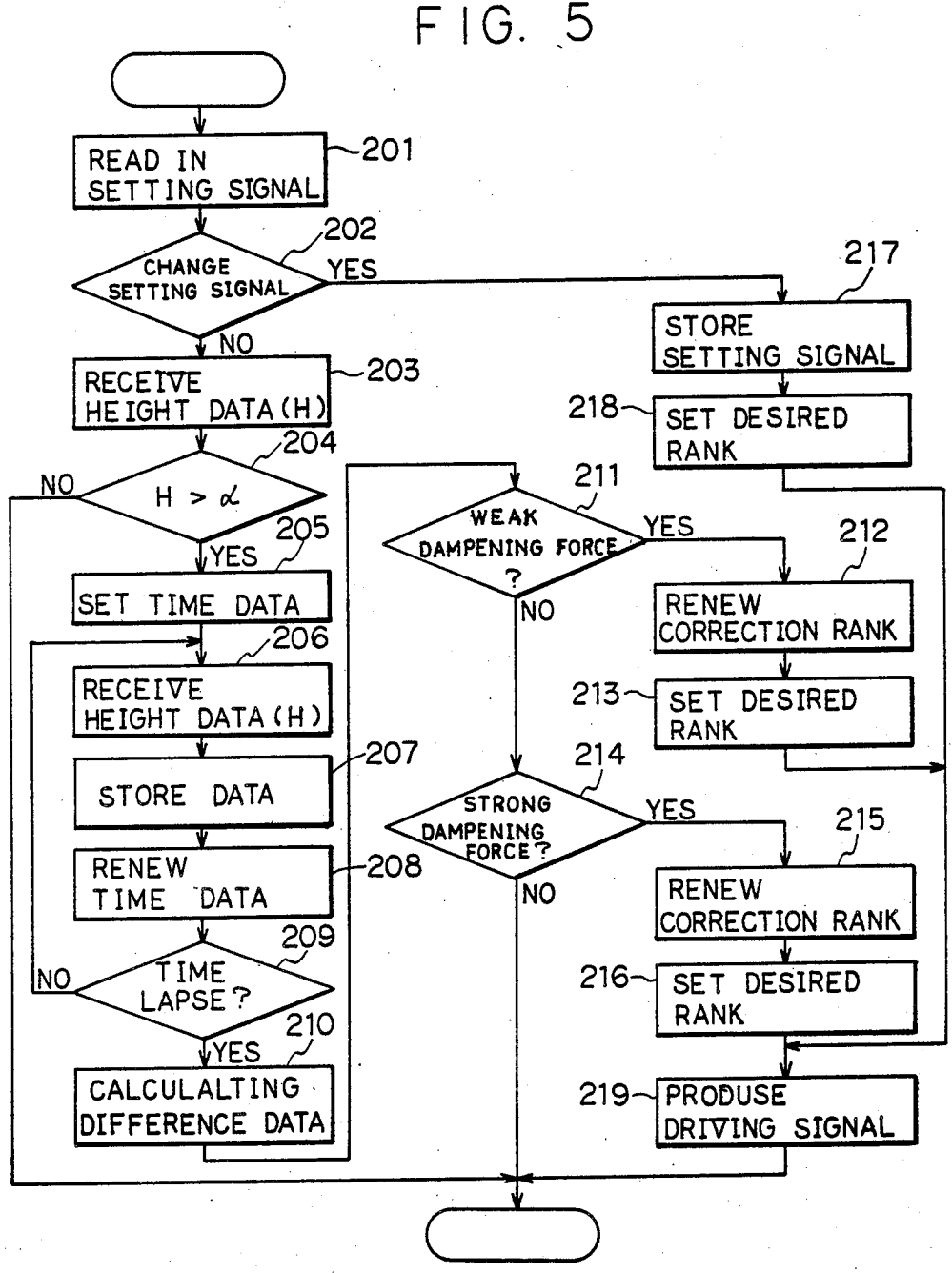

Numeral 4 designates a microcomputer for receiving the setting signal from the setting switch portion 1 and the digital signal from A/D converter 3 and performing digital computational operations based on a predetermined stored program shown as flowcharts in FIGS. 4 and 5 to generate a drive signal for changing the dampening force.

Numeral 5 designates a drive circuit for driving a stepping motor 6 to change the dampening force of a shock absorber 7 of a vehicle in response to the drive signal from the microcomputer 4.

The drive circuit 5, the stepping motor 6 and the shock absorber 7 are provided for each wheel. Drive circuits, stepping motors and shock absorbers for other wheels have same structure as the drive circuit 5, the stepping motor 6 and the shock absorber 7, respectively, whereby the shock absorbers are simultaneously controlled in response to the drive signal from the microcomputer 4.

Figure 2:
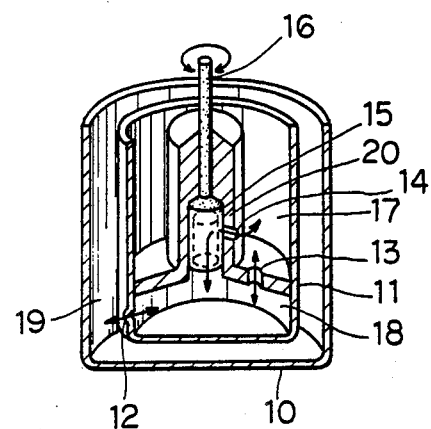
FIG. 2 is a fragmentary longitudinal cross-sectional view of a shock absorber shown in FIG. 1.
Figure 3A:
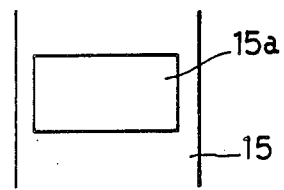
FIGS. 3A and 3B are schematic views illustrating a variable orifice of the shock absorber shown in FIG. 2.
Figure 3B:
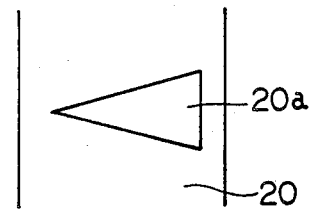

The shock absorber 7 of which principal structure is shown in FIG. 2 comprises an outer cylindrical casing 10 connected to the wheel and an inner cylindrical casing 11 connected to the vehicle chassis, thereby absorbing shocks transmitted from the wheel to the chassis by flowing oil among chambers 17, 18 and 19 through fixed orifices 12 and 13 and a variable orifice 14 in a direction indicated by arrows shown in FIG. 2. A rotary valve 15 provided in the inner casing 11 is connected to a control rod 16 which is rotated by the stepping motor 6. The rotary valve 15 has a rectangular hole 15a as shown in FIG. 3A. A support portion 20 fixed to the inner casing 11 for supporting the rotary valve 15 therein has a triangular hole 20a as shown in FIG. 3B. The amount of the oil flowing through the variable orifice 14 is restricted by the area overlapping between the rectangular hole 15a and the triangular hole 20a. That is, the portion of the rectangular hole 15a formed on the rotary valve 15 is changed by the rotation of the control rod 16 so that the area overlapping between the rectangular hole 15a and the triangular hole 20a changes, whereby the amount of the oil flowing through the variable orifice 14 changes. Thus, the dampening force is linearly changed by the change of the amount of the oil flowing through the variable orifice 14.

Operation of the above-described embodiment will be described next. In a description made hereinunder, operation of the drive circuit 5, the stepping motor 6 and the shock absorber 7 for one wheel is described, but operations of the drive circuits, stepping motors and the shock absorbers for the other wheels are omitted.

Provided that a key switch (not shown) is turned on for starting the operation of the vehicle having the component elements 1 to 7 shown in FIG. 1, each electrical system is turned on by the power supplied from a battery mounted on the vehicle. The microcomputer 4 is also activated by being supplied with a stabilized voltage from a stabilized power supply circuit which is not shown is FIG. 1, so that the processing operation is started from a start step 100 in FIG. 4, followed by a step 101 where registeres, counters and latches in the microcomputer 4 are initialized in the well-known manner. After this, the program proceeds to a step 102 for reading in the setting signal indicative of a selected rank corresponding to the number given to a pushed switch of the setting switch portion 1. The program proceeds to a step 103 for setting a desired rank of the dampening force by adding a rank correction data (described later) indicative of an error by aging etc. to the setting signal, and further the program proceeds to a step 104 for producing a drive signal corresponding to the desired rank to the drive circuit 5 which activates the stepping motor 6 so that the shock absorber 7 provides the dampening force of the desired rank. Accordingly, at the starting time of the vehicle, the dampening force of the shock absorber 7 is initially set in accordance with the pushed switch of the setting switch portion 1. After this, the processing operation of a shock absorber control routine 200 is executed repeatedly.

In the shock absorber control routine 200 shown in FIG. 5, the program first proceeds to a step 201 for reading in the setting signal as in the step 102, subsequently proceeding to a step 202 for deciding whether or not the setting signal has changed by comparing the setting signal with the old setting signal which was stored at a step 217 described later. If the setting signal has not changed, the decision is NO, and the program proceeds to a step 203 for receiving a height data H through the A/D converter 3 from the height sensor 2. Subsequently, the program proceeds to a step 204 for deciding whether or not the height data H is more than a reference level $\alpha$ predetermined to correspond to a maximum height which will be exceeded only when the vehicle is subjected to excessive vibrating motion. If the vehicle is not subjected to the vibrating motion and the height data H is less than the predetermined level $\alpha$, the decision is NO. After this, the program returns to the step 102. Therefore, during a condition that the setting signal does not change and the height data H input at the step 203 is less than the reference level $\alpha$, the above-mentioned processing operation is executed repeatedly.

After that, provided that the pushed switch is changed in order to change the desired rank of dampening force, the setting signal becomes different from the old setting signal stored at the step 217, so that the decision at the step 202 becomes YES. The program then proceeds to a step 217 for storing the currently produced setting signal for using as the old setting signal at the step 202 later. The old setting signal is stored nonvolatilely even if the microcomputer 4 is not supplied with the stabilized voltage. Subsequently, the program proceeds to a step 218 for setting the desired dampening rank by adding the rank correction data to the setting signal, proceeding to a step 219 for producing the drive signal corresponding to the desired dampening rank to the drive circuit 5. Accordingly, the drive circuit 5, receiving the drive signal, drives the stepping motor 6 to rotate stepwise the control rod 16 to a desired position, whereby a desired dampening force of the shock absorber 7 is assured. After the step 219, the program restores the above-mentioned steps 201 to 203.

The correction of the dampening force for compensating the aging effects etc. will be explained next in detail.

Figures 6A, 6B:
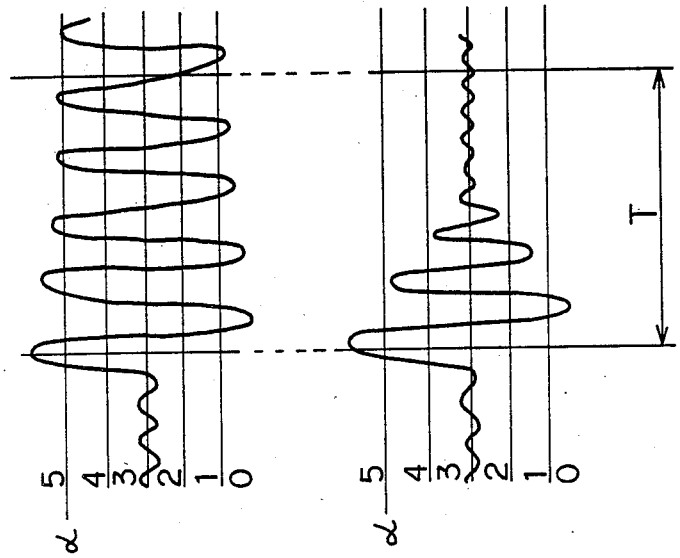
FIGS. 6A and 6B are charts showing the characteristics of dampening forces.

Provided that the vehicle vibrates transiently by running an unpaved road for instance, the height data H applied through the A/D convertor 3 from the height sensor 2 becomes more than the reference level $\alpha$ as shown FIGS. 6A and 6B. Accordingly, the decision of the step 204 becomes YES. The program then proceeds to a step 205 for setting a time data corresponding to a fixed time T shown in FIGS. 6A and 6B, proceeding to a step 206 for receiving the height data H as in the step 203. Subsequently the program proceeds to a step 207 for deciding to which level among predetermined 6 levels allotted into 0 to 5 as shown in FIGS. 6A and 6B the height data H belongs and storing a data to a storage area corresponding to the decided level. For instance, when the input height data H is discriminated to belong to level 5, data stored in a storage area corresponding to the level 5 is renewed by adding 1 to the previously stored data. The program then proceeds to a step 208 for renewing the time data, that is, substracting 1 from the time data, proceeding to a step 209 for deciding whether or not the time data is reduced to 0 with the lapse of the time T. During the decision of the step 209 is NO indicating that the time period T has not elapsed yet, the program proceeds repeatedly from the step 206 to the step 209. Accordingly, during the time period T, the height data H is repeatedly analyzed and accumulated in the storage areas with respect to each levels. FIG. 6A shows the change of the height data H in the case where the dampening force is weak, and FIG. 6B shows a change of the height data H in the case where the dampening force is strong. In the FIGS. 6A and 6B, the height data H discentrize all over the ranks 0 to 5 in the case where the dampening force is weak, and the height data H center to the ranks 2 and 3 in the case that the dampening force is strong.

With the lapse of the time T, the decision of the step 209 becomes YES, and the program proceeds to a step 210 for obtaining a difference data by calucating a difference between the dampening force data based upon the data of levels stored at the step 207 and a preset data, determined corresponding to the setting signal, indicative of a value which the dampening force data attains. For instance, a plurality of preset coefficients are given to the respective levels, for instance, 3 to levels of 0 and 5, 2 to levels of 1 and 4, and 1 to levels of 2 and 3, the data stored in the respective storage areas are multiplied by the respective coefficients, and the multiplied numbers are added to obtain the dampening force data. The difference data are then calculated by substracting the dampening force data from the preset data corresponding to the setting signal so that control error due to aging etc. is derived. The program then proceeds to a step 211 for deciding whether or not the difference data is less than a predetermined lower limit, that is, whether or not the dampening force is weaker than the desired one. If the decision is YES, the program proceeds to a step 212 for decreasing the rank correction data by 1 rank, proceeding to a step 213 for setting the desired rank of dampening force by adding the rank correction data to the setting signal stored at the step 217. The desired rank is made lower than the previous rank by 1 level, which means an increase of the dampening force. Accordingly, the dampening force is increased in accordance with the processing operation of the step 219.

On the other hand, if the decition of the step 211 is NO, the program proceeds to a step 214 for deciding whether or not the difference data is more than a predetermined upper limit, that is, whether or not the dampening force is stronger than the desired one. If the decision is YES, the program proceeds to a step 215 for increasing the rank correction data by 1 rank, proceeding to a step 216 for setting the desired rank by adding the rank correction data to the setting signal stored at the step 217. The desired rank is made higher than the previous rank by 1 level, which means a decrease of the dampening force. Accordingly, the dampening force is decreased in accordance with the processing operation of the step 219.

The above-mentioned rank correction data is stored nonvolatilely even if the microcomputer 4 is not supplied with the stabilized voltage, and the desired rank of the dampening force is set by adding the rank correction data to the setting signal when the pushed switch in the setting switch portion 1 is changed. Accordingly, the dampening force of the shock absorber 7 is corrected by the rank correction data corresponding to the aging etc. even if the setting of the desired dampening force is changed.

It should be noted in the above-described embodiment that, though the setting switch portion 1 is used to set the desired dampening force manually, a speed sensor may be provided, so that the desired dampening force may be automatically set to become strong in accordance with an increase in the speed of the vehicle. Further, a steering angle sensor, a brake switch, an acceleration sensor, and a transmission shift position sensor may be provided, so that the desired dampening force may be automatically set to become weak at a curve running period, a brake operating period, an accelerating period, or a transmission shift changing period.

Still further, though the time T for measuring the dampening force is fixed, the time T may be variable in accordance with the speed of the vehicle for exactly measuring the dampening force in relation to the speed of the vehicle.

Still further, though the dampening force is detected by the change of the height of the vehicle, the dampening force may be detected by detecting an expansion and contraction state of the shock absorber.

What is claimed is:

1. A shock absorber control system for controlling a dampening force of a shock absorber of a vehicle comprising:
    setting means for setting a desired dampening force changeable within a predetermined range;
    drive means for driving said shock absorber to change the dampening force of said shock absorber linearly;
    control means for controlling said drive means in accordance with said desired dampening force when the setting of said desired dampening force has been changed;
    detecting means for detecting an actual dampening force of said shock absorber;
    correcting means for correcting the dampening force of said shock absorber by controlling said drive means in accordance with a difference between said desired dampening force and said detected actual dampening force.

2. A control system according to claim 1, wherein said difference is nonvolatilely stored and said control means controls said drive means in accordance with said desired dampening force and said stored difference.

3. A control system according to claim 1, wherein said setting means has a plurality of switches which respectively mean desired dampening forces and sets said desired dampening force in response to a manipulated one of said switches.

4. A shock absorber control system for controlling a dampening force of a shock absorber of a vehicle comprising:
    setting means for setting a desired dampening force;
    drive means for driving said shock absorber to change the dampening force of said shock absorber;
    deciding means for deciding whether or not a dampening state of the vehicle excesseds a predetermined value;
    detecting means for detecting an actual dampening force of said shock absorber by the change of the dampening state of the vehicle from the time when the decision of said deciding means has become positive;
    control means for controlling said drive means to make the actual dampening force detected by said detecting means correspond with said desired dampening force.

5. A shock absorber control system for controlling a dampening force of a shock absorber of a vehicle comprising:
    setting means for setting a desired dampening force;
    drive means for driving said shock absorber to change the dampening force of said shock absorber;
    a height sensor for detecting a height of the vehicle;
    deciding means for deceding whether or not the detected height exceeds a predetermined value;
    detecting means for detecting an actual dampening force of said shock absorber by the change of the detected height from the time when the decision of said deciding means has become positive;
    control means for controlling said drive means to make the actual dampening force detected by said detecting means correspond with said desired dampening force.

* * * * *